United States Patent
Lee et al.

(10) Patent No.: US 9,033,321 B2
(45) Date of Patent: May 19, 2015

(54) STRUCTURE OF ACTIVE MOUNT

(75) Inventors: Dong-Wook Lee, Seoul (KR); Jang-Ho Kim, Bucheon-shi (KR); Yong-Woong Cha, Yongin-shi (KR)

(73) Assignee: Hyundai Motor Company, Seoul (KR)

( * ) Notice: Subject to any disclaimer, the term of this patent is extended or adjusted under 35 U.S.C. 154(b) by 440 days.

(21) Appl. No.: 13/605,642

(22) Filed: Sep. 6, 2012

(65) Prior Publication Data

US 2013/0061743 A1 Mar. 14, 2013

(30) Foreign Application Priority Data

Sep. 14, 2011 (KR) .......................... 10-2011-0092542

(51) Int. Cl.
*F16F 13/26* (2006.01)
*F16F 13/10* (2006.01)

(52) U.S. Cl.
CPC .............. *F16F 13/268* (2013.01); *F16F 13/10* (2013.01)

(58) Field of Classification Search
CPC ........... F16F 1/387; F16F 6/005; F16F 13/14; F16F 13/1427; F16F 13/1409; F16F 13/1463; F16F 13/26; F16F 13/264; F16F 13/262; F16F 13/30; B60G 2400/252
USPC ............... 267/140.12, 141.1, 140.14–140.15; 92/131, 12.1, 12.2
See application file for complete search history.

(56) References Cited

U.S. PATENT DOCUMENTS

| | | | |
|---|---|---|---|
| 5,388,812 A | 2/1995 | Kojima et al. | |
| 6,325,364 B1 * | 12/2001 | Muramatsu | 267/140.14 |
| 2005/0029720 A1 * | 2/2005 | Bodie et al. | 267/140.14 |
| 2007/0029712 A1 | 2/2007 | Nemoto | |
| 2009/0064855 A1 * | 3/2009 | Kayukawa | 92/12.2 |
| 2012/0242020 A1 * | 9/2012 | Muraoka et al. | 267/140.14 |

FOREIGN PATENT DOCUMENTS

| | | |
|---|---|---|
| JP | 9-100868 A | 4/1997 |
| JP | 11-247921 A | 9/1999 |

* cited by examiner

*Primary Examiner* — Anna Momper
*Assistant Examiner* — San Aung
(74) *Attorney, Agent, or Firm* — Morgan, Lewis & Bockius LLP (57) ABSTRACT

An active mount structure may include an actuator coupled to an actuator plate coupled to an orifice plate within a housing, wherein the actuator includes a plunger coupled to the actuator plate, a first rod rotatably coupled to a bottom of the plunger and rotated by a first motor unit, wherein the first rod includes a rotating shaft rotatably coupled to the plunger, one side of the rotating shaft extending to form an extending portion, and a rotation retention portion formed at the extending portion, a swash plate defining a center hole therein and having shaft protrusions, wherein the first rod may be disposed in the center hole and the rotation retention portion may be engaged to the swash plate, and a second rod engaged at the swash plate and raised or lowered by a second motor unit, wherein the shaft protrusions may be rotatably coupled to the housing.

10 Claims, 7 Drawing Sheets

<SWASH PLATE NOT INCLINED>

<SWASH PLATE INCLINED>

STRUCTURE OF ACTIVE MOUNT

CROSS-REFERENCE TO RELATED APPLICATIONS

The present application claims priority to Korean Patent Application No. 10-2011-0092542, filed on Sep. 14, 2011, the entire contents of which is incorporated herein for all purposes by this reference.

BACKGROUND OF THE INVENTION

1. Field of the Invention

The present invention relates to the structure of a mount mounted in the engine room of a vehicle to support the weight of an engine and dampen vibration, and more particularly, to the structure of an active mount in which damping characteristics are varied when power is applied thereto, the structure of the active mount improving the performance of an actuator that is capable of generating vibrations or controlling the volume of a liquid chamber.

2. Description of Related Art

Not only does an engine of a vehicle always vibrate structurally, the engine also vibrates due to undulations on the ground while the vehicle travels. These vibrations do not act alone, but in combination with various other factors in vertical, lateral, and forward and rearward directions.

Moreover, an engine is not mounted separately from a vehicle body and is connected to a transmission device, a duct system, etc., of the vehicle, so that vibrations generated by the engine affect the entire vehicle.

Therefore, in order to dampen vibrations generated by an engine, the engine is mounted on a vehicle body through an (engine) mount. The mount generally used is a rubber type employing the resilience of the material, or a liquid filled type that is filled with hydraulic fluid and uses viscosity according to the movement of the hydraulic fluid to dampen vibrations.

From thereamong, the liquid filled type mount is referred to as a hydromount which can dampen vibrations over a broader range and is widely used in many types of vehicles.

The hydromount has a structure in which an insulator of a resilient material and an orifice plate are coupled to a cup-shaped housing, and has an inside partitioned into an upper liquid chamber and a lower liquid chamber that are filled with a certain amount of hydraulic fluid. The orifice plate is vertically open and has an annular flow path formed along the perimeter thereof, and is configured to move hydraulic fluid in the upper liquid chamber and the lower liquid chamber by means of resilient compression of the insulator.

In order for an electronic control unit (ECU) of a vehicle to more actively control the damping function of a mount according to the travelling conditions of the vehicle and the operation of the engine, active mounts are being developed that are equipped with electronic or power actuators capable of generating vibrations or adjusting the volume of liquid chambers in hydromounts.

The active mounts have been developed to control the amount of damping according to a predetermined algorithm, on the basis of information and acceleration signals on a vehicle's engine and operating state, in order to operate while providing the optimum amount of damping in situations such as when the vehicle is idling, traveling at low speeds, travelling at high speeds, and turning.

Figure 1:
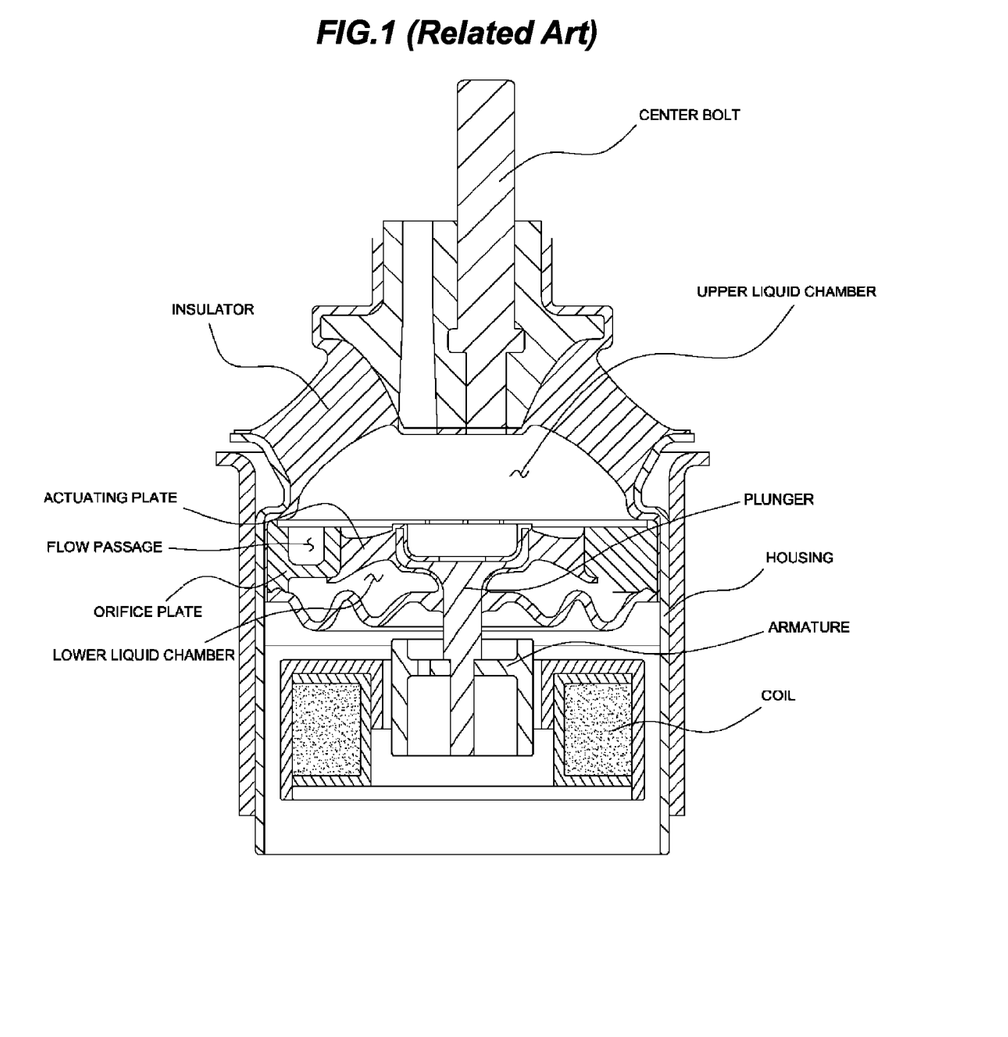
FIG. 1 is a cross-sectional view of an active mount in the related art.

While various structures of active mounts are being developed, to describe one related art technology with reference to FIG. 1, like a typical hydromount, an active mount is configured with an upper liquid chamber and lower liquid chamber partitioned by an orifice plate, the hydraulic fluid being made to flow by means of resilient compression (and/or vibration) of the insulator (generated by the input of vibrations from an engine coupled with a center bolt), and also configured with an actuator for generating vibrations or changing the volume of the liquid chambers to dampen the input vibrations. That is, an actuating plate made of a resilient material is coupled to the orifice plate, and a plunger is further installed to vibrate the actuator plate. An actuator, formed with a coil or the like for generating electromagnetic force to enable the plunger to be pulled by attracting force, is further installed.

The actuator vibrates the plunger at the same phase as the vibration input into the mount so as to improve the damping rate for the vibration transmitted to the vehicle body. The operating principle of this plunger vibration is the repeated process of generating attracting force to move the plunger downward when electric power is applied to an electronic actuator, and of removing the attracting force and restoring the plunger to the original position by means of the restorative force of the actuating plate rubber that was resiliently deformed by the plunger moving downward, when the applied power is turned off.

As illustrated, the actuator has a structure in which an armature and a coil are additionally installed toward the bottom of the plunger so as to apply electromagnetic force (attracting force) in a direction toward the bottom of the plunger, by means of applying an electric current. Thus, the actuating plate is resiliently expanded when the plunger is moved by means of the electromagnetic force, so that when current to the coil is applied and turned off repeatedly, the plunger may be vibrated by being moved and restored to the original position thereof by means of the electromagnetic force and the resilience of the actuator plate.

As described above, an active mount in the related art has limitations in terms of response speed due to the number of vibrations and amplitude that can be generated by using the resilience of an actuating plate material as restorative force.

Further, the precise control of actuator plate displacement with a contactless method using electromagnetic force is difficult, and unintended vibration noise may be generated by the free vibration of the actuating plate from after the resilient restoring of the actuating plate to before the application of electric power to the actuator. In addition, this noise is the cause for reducing vibration insulation performance. Moreover, the structure is one in which the plunger moves downward from an original position and then returns to the original position, so that the rate of change in volume (of a liquid chamber) is low, which has a structural limitation on controlling performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active mount that can obviate the above-described limitations.

In an aspect of the present invention, an active mount structure, may include an actuator coupled to an actuator plate coupled to an orifice plate within a housing, and moving the actuating plate vertically, wherein the actuator may include a plunger coupled to the actuator plate, a first rod rotatably coupled to a bottom of the plunger and rotated by a first motor unit, wherein the first rod may include a rotating shaft rotatably coupled to the bottom of the plunger, one side of the rotating shaft extending in a perpendicular direction from a direction of the rotation shaft to form an extending portion, and a rotation retention portion formed at an end of the extending portion, a swash plate defining a center hole therein and having shaft protrusions protruding from both sides of a periphery thereof, wherein the first rod is disposed in the center hole and the rotation retention portion is engaged to the swash plate such that the first rod is rotatable around the periphery of the swash plate, and a second rod engaged at a side of the swash plate and raised or lowered by a second motor unit coupled thereto, wherein the shaft protrusions are rotatably coupled to the housing, and the first rod rises or descends by the first motor unit, such that the swash plate is inclined by rising and descending of the second rod and the first rod is rotated while rising or descending.

The rotation retention portion of the first rod is engaged to an inner periphery of the swash plate.

The rotation retention portion is formed in a "⊏" shape into which the inner periphery of the swash plate is inserted, and may include a bearing mounted on an inner side thereof to reduce frictional resistance, wherein the second rod may include a gripping portion formed on a top thereof into which an outer periphery of the swash plate is inserted, and a bearing reducing frictional resistance is mounted on an inner side of the gripping portion.

The first rod may include a counterweight projecting at an opposite side of the rotation retention portion to prevent eccentric vibrations.

The first rod may include a stepped head portion formed at a top thereof, and the plunger may include a coupling slot formed in the bottom thereof in which the head portion is rotatably seated.

The rotation retention portion of the first rod is engaged to an outer periphery of the swash plate, wherein the swash plate may include two circular plates stacked vertically with a uniform space therebetween, the first rod is engaged to an outer periphery of an upper plate of the two circular plates, and the second rod is coupled to an outer periphery of a lower plate of the two circular plates.

The rotation retention portion is formed in a "⊏" shape into which the outer periphery of the upper plate is inserted, and may include a bearing mounted on an inner side thereof to reduce frictional resistance.

The second rod may include a gripping portion formed on a top thereof into which the outer periphery of the lower plate is inserted, and a bearing reducing frictional resistance is mounted on an inner side of the gripping portion.

The present invention as configured above may improve a response speed because the plunger is moved by means of a physical coupling, and unnecessary free vibrations are not generated so that vibration noise may be suppressed.

The actuating plate is moved upward and/or downward (from the original position reference thereof), so that the change in volume of the liquid chambers may be set higher than that of a related art structure.

Further, the displacement measurement of the actuating plate is possible according to the rotating position of the swash plate, thus enabling more precise control of the vibration of the actuating plate.

In addition, a projecting counterweight may be further formed in order to prevent eccentric vibrations, the plunger and the first rod are separably coupled and thus may be more easily assembled, and the first rod and the second rod are engaged to the swash plate by means of a sliding bearing and/or a ball joint, thus suppressing frictional resistance.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an active mount structure according to exemplary embodiments of the present invention will be described in more detail with reference to the drawings.

Figure 2:
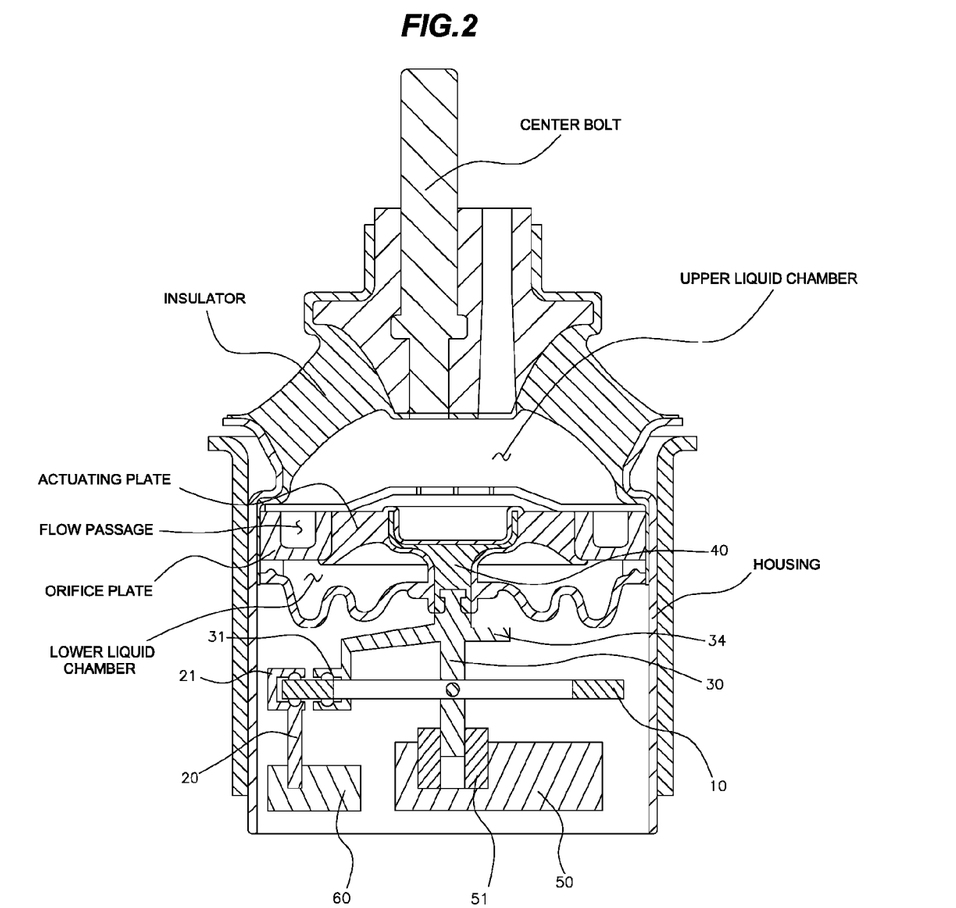
FIG. 2 is a cross-sectional view of an active mount according to various exemplary embodiments of the present invention.
Figure 3:
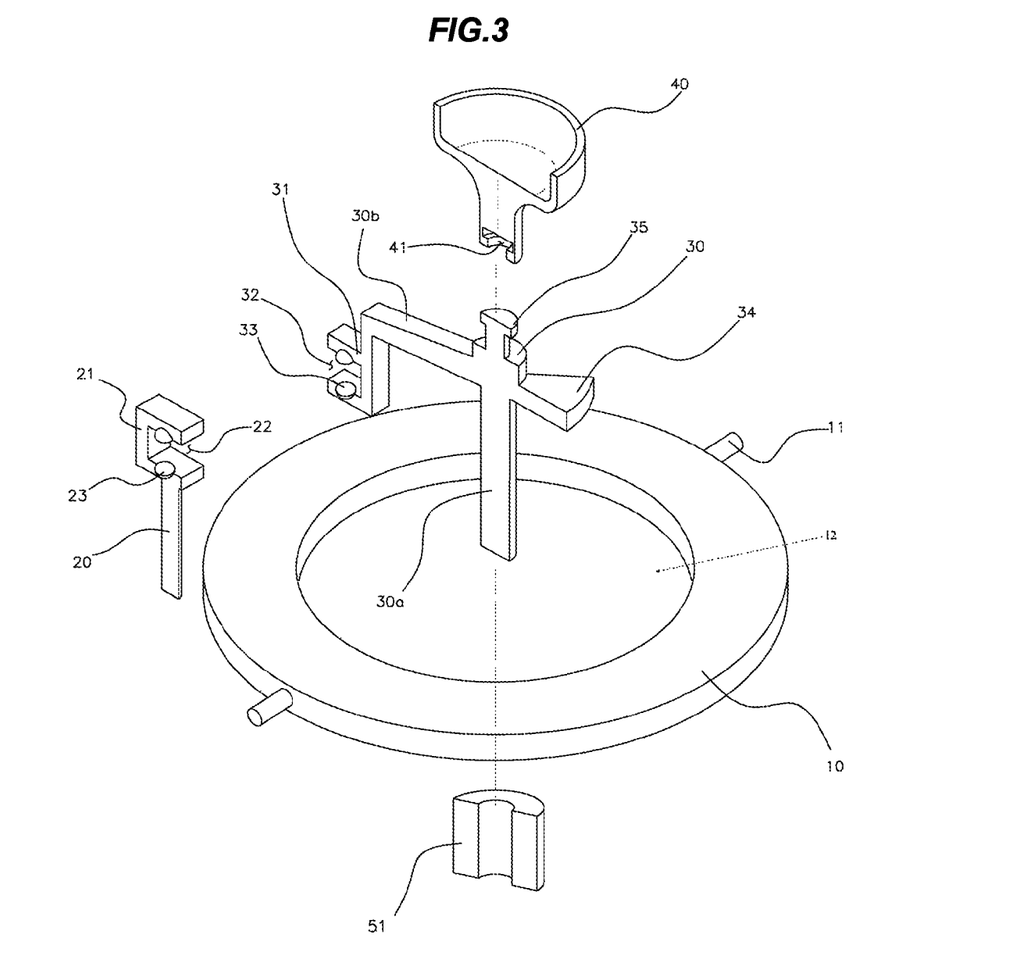
FIG. 3 is an exploded perspective view of an actuator according to the various exemplary embodiments of the present invention.
Figure 4:
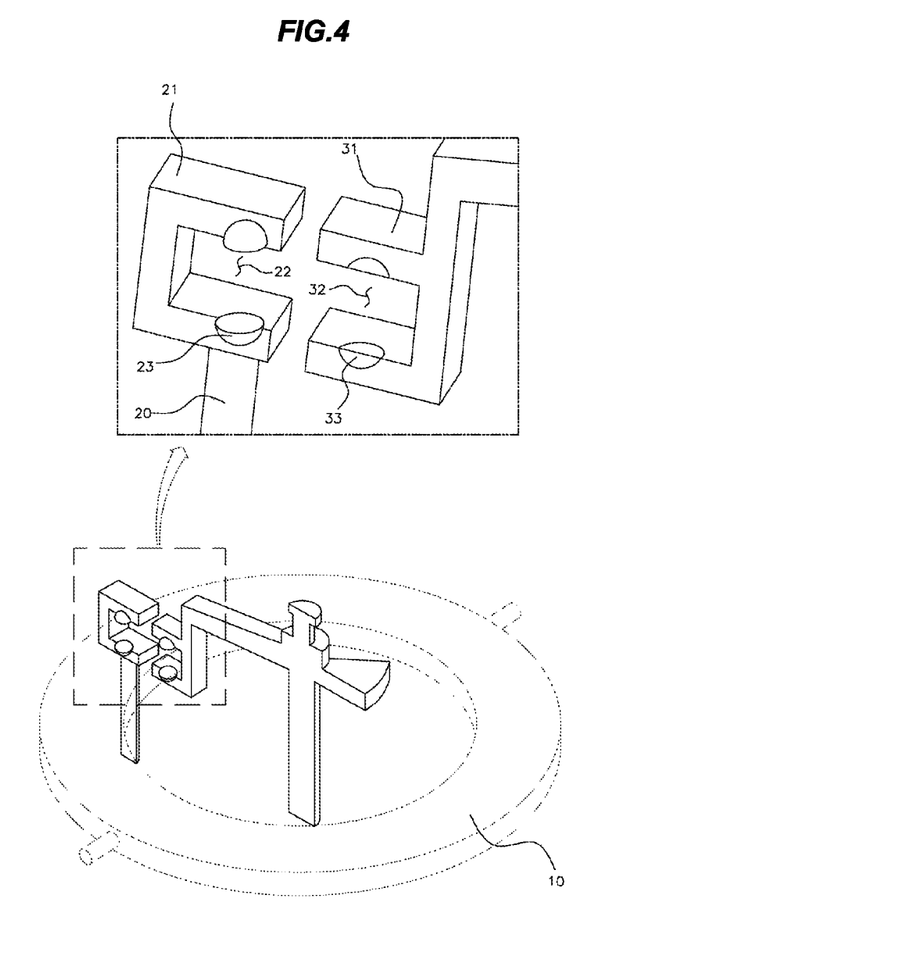
FIG. 4 is a perspective view and a partially enlarged view of the actuator according to the various exemplary embodiments of the present invention.

Referring to FIGS. 2 to 4 illustrating the actuator according the first exemplary embodiment of the present invention, the actuator is coupled to an actuating plate coupled to an orifice plate within a housing and moves the actuating plate vertically. The actuator includes a cup-shaped plunger 40 coupled with the actuating plate, and a first rod 30 coupled to the bottom of the plunger 40. The first rod 30 is rotated by means of a first motor unit 50 coupled to the bottom thereof, and has one side thereof extending in a perpendicular direction from the direction of a rotation shaft, and a rotation retention portion 31 formed at an end thereof.

In particular, (as illustrated in FIG. 3) the first rod 30 is formed such that a rotation shaft 30a and an extending portion 30b are formed (substantially) perpendicular, and such that a rotation retention portion 31 is formed in an end of the extending portion 30b extending outward in a bent "⊏" shape to define an open portion 32. A counterweight 34 of a predetermined size and weight is formed protruding at the other side of the extending portion 30b in order to prevent eccentric vibrations due to an eccentric weight distribution.

A head portion 35 having an expanded diameter is formed at the top of the rotation shaft 30a and inserted in a seating slot 41 of the plunger 40, and a bottom of the rotation shaft 30a is coupled to a bushing 51 mounted on the first motor unit 50. The bushing 51 transmits rotational force to the rotation shaft 30a and is coupled through a method such as spline coupling in order to enable the rising and descending of the first rod 30. (For reference, in order to illustrate the innards of the plunger, the first rod, the second rod, and the bushing, FIG. 3 depicts partially cut views thereof.)

The first rod 30 is coupled at the center of a swash plate 10 having a round plate shape defining a center hole 12. The center hole 12 is formed in a predetermined size at the center of the swash plate 10. Also, a shaft protrusion 11 is respectively formed on one side and the other side of the swash plate 10. The swash plate 10 is coupled to be rotatable within the housing, through the shaft protrusions 11 disposed on either side thereof as a rotation shaft. The shaft protrusions 11 are cylindrically shaped and are inserted into slots defined in the housing of the mount.

The first rod 30 according to the first exemplary embodiment of the present invention is coupled such that a rotation retention portion 31 thereof is engaged to an inner periphery of the swash plate 10. That is, the inner periphery of the swash plate 10 is inserted and coupled in an open portion 32 of the "⊏" shaped rotation retention portion 31, and a sliding bearing 33 is mounted on the upper and lower surfaces of the open portion 32 to suppress frictional resistance, and a lubricant is (selectively) applied.

Further, (in a form similar to the rotation retention portion) the second rod 20 with a "⊏" shaped gripping portion 21 formed on the top thereof has the bottom thereof coupled to the second motor unit 60 to rise and descend, and the gripping portion 21 is coupled in engagement with the outer periphery of the swash plate 10. A sliding bearing 23 is also preferably mounted to the upper and lower surfaces of the open portion 22 of the gripping portion 21 to suppress frictional resistance.

Figure 5:
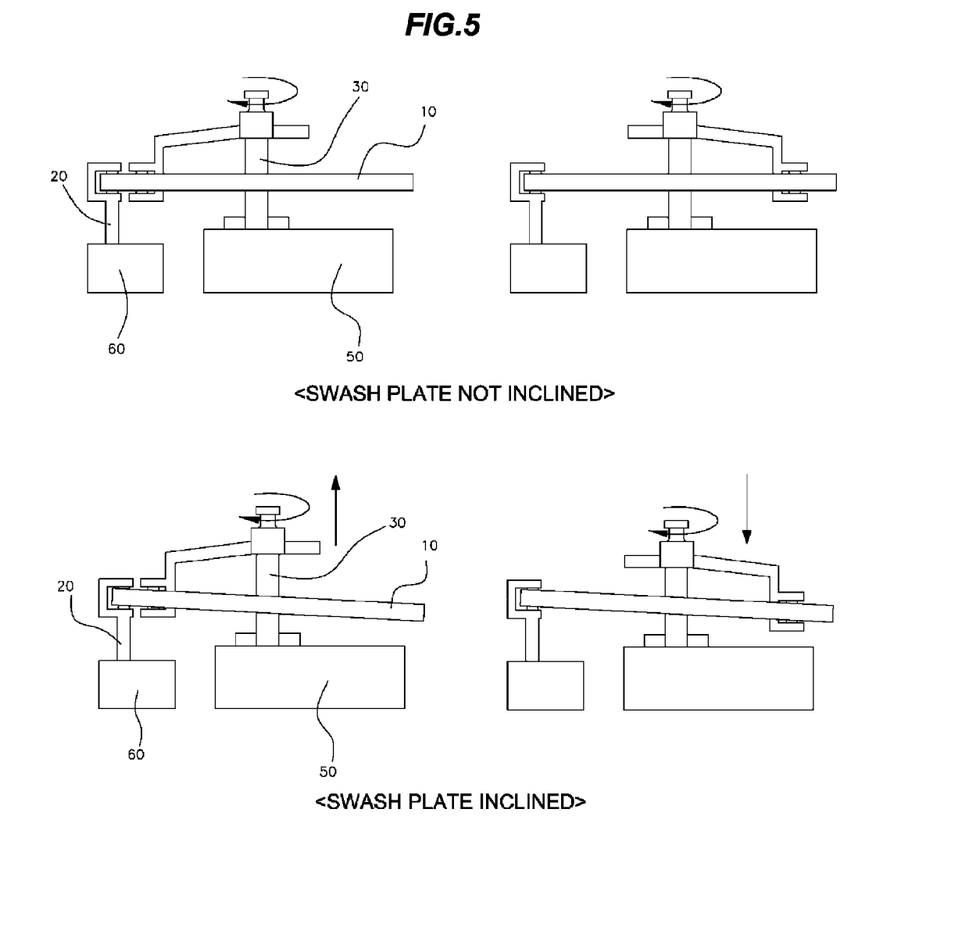
FIG. 5 is different views of the actuator being actuated according to the tilt of actuating swash plate according to the various exemplary embodiments of the present invention.

Like the actuator configured above, as illustrated in FIG. 5, the second rod 20 rises (or descends) by means of the operation of the second motor unit 60, and the swash plate 10 forms a predetermined sloped angle (with the shaft protrusions as a rotation shaft) and is inclined. Here, since the rotation trajectory of the rotation retention portion 31 coupled to slide on the inner periphery of the swash plate 10 according to the inclined degree of the swash plate 10 is formed to rise or descend, the first rod 30 that is rotated by the operation of the first motor unit 50 rises or descends according to the rotated position (as indicated by the arrows). According to this movement, the plunger 40 and actuating plate may vibrate vertically or move upward or downward. Since excessive rising of the second rod 20 increases the frictional force between the first rod 30 and the swash plate 10, the inclined angle of the swash plate 10 is preferably formed at a range of 2° to 10°, and it is preferable that the open portion 32 of the rotation retention portion 31 is formed a certain size larger than the thickness of the swash plate 10 in order for a predetermined gap to be formed between the rotation prevention portion 31 and the swash plate 10.

Figure 6:
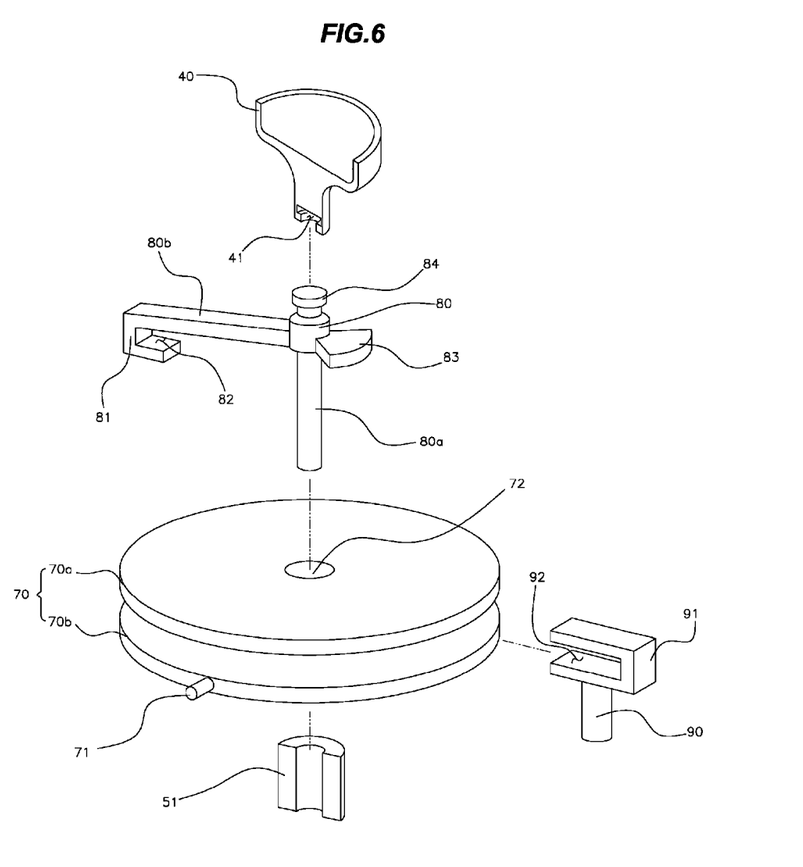
FIG. 6 is an exploded perspective view of an actuator according to various exemplary embodiments of the present invention.
Figure 7:
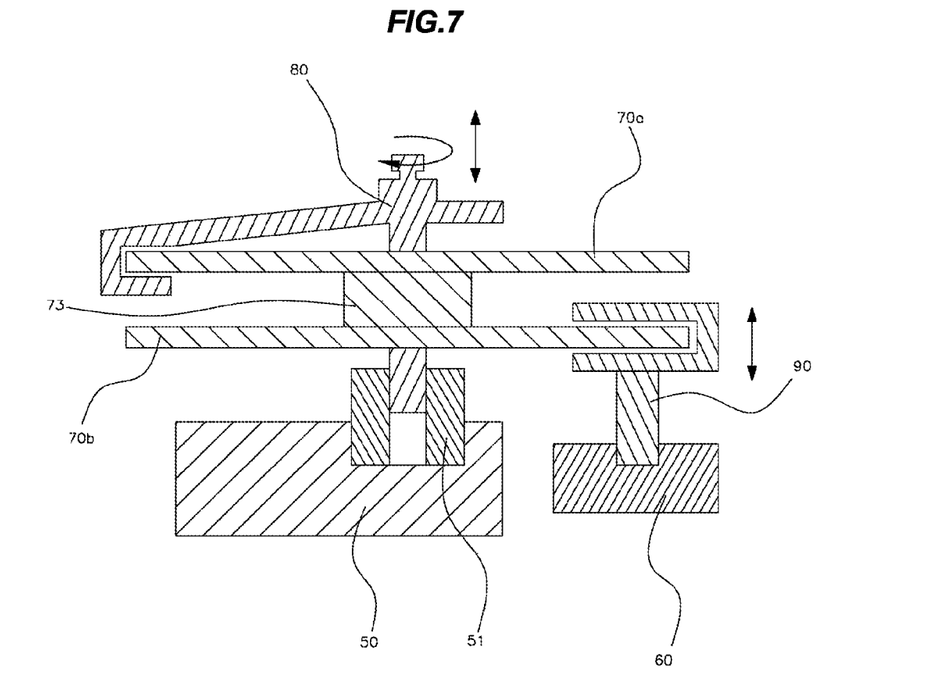
FIG. 7 is a cross-sectional view of the actuator according to the various exemplary embodiments of the present invention.

An actuator according to a second exemplary embodiment of the present invention is illustrated in FIGS. 6 and 7. The actuator according to the second exemplary embodiment, as in the first exemplary embodiment, has a cup-shaped plunger 40 coupled to an actuator plate, and a first rod 80 coupled to the bottom of the plunger 40. The first rod 80 is rotated while capable of being raised and lowered by the first motor unit 50 and the bushing 51 coupled to the bottom thereof, and a rotation retention portion 81 is bent at an end of an extending portion 80b extending perpendicularly from a rotation shaft 80a. That is, the first rod 80 is formed so that the rotation shaft 80a and the extending portion 80b are perpendicular, and the rotation retention portion 81 is formed of a predetermined size and bent inward from an end of the extending portion 80b to form an open portion 82. Also, as in the first exemplary embodiment, a counterweight 83 of a predetermined size and weight is formed protruding on the other side of the extending portion 80b so as to prevent eccentric vibrations due to an eccentric weight distribution. A head portion 84 having an increased diameter is formed on the top of the rotation shaft 80a and inserted in the coupling slot 41 of the plunger 40.

A swash plate 70 according to the second exemplary embodiment has a configuration in which two plates are stacked with a predetermined gap therebetween. Specifically, a pipe-shaped connecting portion 73 in which a center hole 72 is formed is formed between a top plate 70a and a bottom plate 70b, and the two plates are disposed apart from each other. Also, shaft protrusions 71 are formed on both sides of the bottom plate 70b (or the top plate 70a).

The first rod 80 according to the second exemplary embodiment of the present invention has the rotation shaft 80a inserted in the center hole 72 and the rotation retention portion 81 engaged and coupled to the outer periphery of the top plate 70a, and being configured the same as or similar to the first exemplary embodiment, and the second rod 90, that is coupled to the second motor unit 60 to rise and descend, is coupled to be engaged with the outer periphery of the bottom plate 70b. Accordingly, when the swash plate 70 forms a predetermined inclined angle and slopes according to the rising or descending of the second rod 90, the first rod 80 rises or descends through the same principle as that in the first exemplary embodiment. In the second exemplary embodiment as well, a sliding bearing is preferably installed at open portions 82 and 92 of the rotation retention portion 81 and the gripping portion 91 in order to suppress frictional resistance. Moreover, to prevent interference when the swash plate 70 is inclined, the inner diameter of the center hole 72 is preferably formed a predetermined size larger than the rotation shaft 80a of the first rod 80.

As another exemplary embodiment of the present invention, instead of a "⊏" shape, the gripping portion may be configured with a typical structure of a ball joint, and as long as there is no interference with the coupling positions of the first rod and the second rod, various methods may be used to achieve the coupling at predetermined positions on the inner periphery and outer periphery, respectively, of the swash plate.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active mount structure, comprising:
   an actuator coupled to an actuator plate coupled to an orifice plate within a housing, and moving the actuating plate vertically,
   wherein the actuator includes:
   a plunger coupled to the actuating plate;
   a first rod rotatably coupled to a bottom of the plunger and rotated by a first motor unit,
   wherein the first rod includes:
      a rotating shaft rotatably coupled to the bottom of the plunger, one side of the rotating shaft extending in a perpendicular direction from a direction of the rotation shaft to form an extending portion; and
      a rotation retention portion formed at an end of the extending portion;
   a swash plate defining a center hole therein and having shaft protrusions protruding from both sides of a periphery thereof, wherein the first rod is disposed in the center hole and the rotation retention portion is engaged to the swash plate such that the first rod is rotatable around the periphery of the swash plate; and
   a second rod engaged at a side of the swash plate and raised or lowered by a second motor unit coupled thereto,
   wherein the shaft protrusions are rotatably coupled to the housing, and the first rod rises or descends by the first motor unit, such that the swash plate is inclined by rising and descending of the second rod and the first rod is rotated while rising or descending.

2. The active mount structure of claim 1, wherein the rotation retention portion of the first rod is engaged to an inner periphery of the swash plate.

3. The active mount structure of claim 2, wherein the rotation retention portion is formed in a "⊏" shape into which the inner periphery of the swash plate is inserted, and includes a bearing mounted on an inner side thereof to reduce frictional resistance.

4. The active mount structure of claim 3, wherein the second rod includes a gripping portion formed on a top thereof into which an outer periphery of the swash plate is inserted, and a bearing reducing frictional resistance is mounted on an inner side of the gripping portion.

5. The active mount structure of claim 1, wherein the first rod includes a counterweight projecting at an opposite side of the rotation retention portion to prevent eccentric vibrations.

6. The active mount structure of claim 1, wherein the first rod includes a stepped head portion formed at a top thereof, and the plunger includes a coupling slot formed in the bottom thereof in which the head portion is rotatably seated.

7. The active mount structure of claim 1, wherein the rotation retention portion of the first rod is engaged to an outer periphery of the swash plate.

8. The active mount structure of claim 7, wherein the swash plate includes two circular plates stacked vertically with a uniform space therebetween, the first rod is engaged to an outer periphery of an upper plate of the two circular plates, and the second rod is coupled to an outer periphery of a lower plate of the two circular plates.

9. The active mount structure of claim 8, wherein the rotation retention portion is formed in a "⊏" shape into which the outer periphery of the upper plate is inserted, and includes a bearing mounted on an inner side thereof to reduce frictional resistance.

10. The active mount structure of claim 9, wherein the second rod includes a gripping portion formed on a top thereof into which the outer periphery of the lower plate is inserted, and a bearing reducing frictional resistance is mounted on an inner side of the gripping portion.

* * * * *